United States Patent [19]
Gottfried et al.

[11] Patent Number: 5,671,286
[45] Date of Patent: Sep. 23, 1997

[54] STRATEGY FOR CONTROLLING FM STEREO SEPARATION AND FREQUENCY RESPONSE IN NOISY RECEPTION ENVIRONMENTS

[75] Inventors: Gordon Edgar Gottfried, Dearborn; Latha Ravi, Farmington Hills, both of Mich.

[73] Assignee: Ford Motor Company, Dearborn, Mich.

[21] Appl. No.: 489,208

[22] Filed: Jun. 9, 1995

[51] Int. Cl.⁶ .................................................. H04R 5/00
[52] U.S. Cl. ........................ 381/13; 381/10; 455/222; 455/296
[58] Field of Search ...................... 381/13, 2, 3, 4, 381/10, 11, 14; 455/266, 296, 297, 222

[56] References Cited

U.S. PATENT DOCUMENTS

| | | | |
|---|---|---|---|
| 4,195,264 | 3/1980 | Marchetti | 328/134 |
| 4,379,207 | 4/1983 | Kubota | 179/1 GJ |
| 4,388,731 | 6/1983 | King | 455/222 |
| 4,390,749 | 6/1983 | Pearson | 179/1 GJ |
| 4,426,727 | 1/1984 | Hamada | 381/13 |
| 4,574,389 | 3/1986 | Schotz | 381/10 |
| 4,751,734 | 6/1988 | Rucktenwald | 381/13 |
| 4,833,715 | 5/1989 | Sakai | 381/10 |
| 5,027,402 | 6/1991 | Richards, Jr. et al. | 381/10 |
| 5,036,543 | 7/1991 | Ueno | 381/10 |
| 5,077,797 | 12/1991 | Ishikawa | 381/13 |
| 5,113,446 | 5/1992 | Kennedy | 381/10 |
| 5,125,105 | 6/1992 | Kennedy et al. | 455/164.1 |
| 5,201,062 | 4/1993 | Nakamura et al. | 381/10 |
| 5,204,904 | 4/1993 | Carver et al. | 381/13 |
| 5,263,184 | 11/1993 | Nakamura et al. | 455/296 |
| 5,410,751 | 4/1995 | Yokayama | 381/13 |
| 5,432,854 | 7/1995 | Honjo et al. | 381/10 |
| 5,455,866 | 10/1995 | Ohashi | 381/10 |

FOREIGN PATENT DOCUMENTS

| | | | |
|---|---|---|---|
| 0006138 | 11/1991 | Japan | 381/13 |

OTHER PUBLICATIONS

"PAC/CDR-14 General Information", Service Manual, 4 pgs., 1995.

*Primary Examiner*—Curtis Kuntz
*Assistant Examiner*—Xu Mei
*Attorney, Agent, or Firm*—Mark L. Mollon; Roger L. May

[57] ABSTRACT

A control for an FM receiver reduces multipath distortion by reducing stereo separation and high frequency response in the demultiplexed signal. The receiver includes an FM detector including a noise detector as well as the signal strength meter for introducing control signals to a separation control and a frequency response control. Unlike the direct input from a noise detector output to the separation and frequency response controls in the prior art, the noise detector output is input through a noise detection manager that generates responses to at least one, and preferably two thresholds of noise detector output. In the preferred embodiment, a stereo separation manager responds to a first threshold of noise and a frequency response manager responds to the second threshold. The frequency response control reduces the high frequency output at the stereo decoder or the audio processor. The respective managers introduce hysteresis by requiring a higher number of noise occurrences, above the said thresholds, to implement separation reduction, frequency response reduction, or a combination of the two, than the number of occurrences required to maintain these reductions. Thus, excessive switching between levels of stereo separation and between levels of high frequency attenuation is avoided.

9 Claims, 6 Drawing Sheets

STRATEGY FOR CONTROLLING FM STEREO SEPARATION AND FREQUENCY RESPONSE IN NOISY RECEPTION ENVIRONMENTS

TECHNICAL FIELD

The present invention relates generally to noise suppression circuits in radiowave signal receivers and more particularly to an FM radiowave receiver with multipath distortion limitation by stereo separation reduction and high frequency attenuation.

BACKGROUND ART

The de-multiplex signal processing commonly used for reception of FM stereo broadcast signals is more sensitive to the reception environment than monaural reception of the broadcast signal. The signal-to-noise ratio is smaller because the noise in stereo reception contains increased high audio frequency content commonly called "stereo hiss". The difference between stereo and monaural noise levels increases as the field strength at the receiving antenna decreases.

This phenomena is typically reduced by incorporating circuitry that gradually reduces the amount of stereo separation in the receiver as the field strength decreases. Most commercially available FM detector integrated circuits (ICs) provide a DC control voltage that is proportional to the RF field strength at the antenna. Most commercially available FM stereo decoder integrated circuits provide a DC control voltage signal input terminal that controls the amount of stereo separation reproduced by the stereo decoder. Together, these signals can be used to improve FM stereo signal-to-noise ratios by making channel separation a function of RF field strength in response to said control signal.

Many FM stereo decoder ICs also provide a DC voltage input terminal that controls the cutoff frequency of the de-emphasis circuit. Accordingly, the RF field strength control voltage can also be used to reduce the high frequency portion of the audio signal output to the speakers as field strength of the signal broadcast decreases, further improving signal-to-noise ratios. These techniques work well when the receiver's antenna has currents only from the direct wave of the desired frequency induced upon it.

In a typical broadcast environment, a radio signal leaving the transmitter may arrive at the receiving antenna via multiple paths due to reflections off surfaces that do not absorb the frequencies being transmitted, such as buildings, hills, etc. Since the multiple signals at the receiving antenna traveled different distances, they are often out of phase with respect to each other, and thus combine destructively at a particular location, causing a null. The resulting audio disturbance is typically called multipath distortion. In a mobile receiver, the multipath distortion is of short duration, lasting about as long as it takes the antenna to pass through the null. Multipath distortion disrupts FM stereo reception significantly more than monaural reception, due to the shifting in phase of the L-R subcarrier.

To lessen the audible multipath distortion, the stereo separation can be further reduced than would result from prior art signal strength controls. This distortion is also accompanied by audible noise, typically of high frequency content. It is commonly described as a "spitting" sound. This perturbation can be lessened by reducing the high frequency response of the recovered audio. The DC voltage output of the prior art field strength indicators, however, does not always change in magnitude enough to provide the sufficient reduction in stereo separation or high frequency response that would reduce the audible distortion and noise due to multipath signal nulls to an acceptable level to a listener. Several manufacturers have included noise and distortion detection circuits in their designs which can indicate the presence of a predetermined threshold of multipath distortion, and some indicate the severity of the distortion as well by generating a representative voltage level signal. Compensation for the distortion is then provided by reducing separation in direct response to those threshold level or representative level outputs. However, compensating devices that merely react to the presence or level of distortion produce audio disturbances as they abruptly reduce separation and frequency response, and may be perceived as more annoying to the listener than the multipath distortion itself.

SUMMARY OF THE INVENTION

The present invention overcomes the above-mentioned disadvantages by a signal processing strategy that utilizes the noise detector output to control the amount of stereo separation and frequency response, when multipath distortion is present, in a manner less noticeable to the listener. The performance of the receiver is controlled by a microprocessor-based control designed to be consistent with the following psychoacoustic assumptions. An occasional noise disturbance of short duration such as passing through a null, is less annoying than a quick collapse of the stereo image or the frequency response in an attempt to lessen the audible noise and distortion by direct response to a noise detector signal. In addition, during periods of numerous noise disturbances, it is less annoying if the stereo separation, the frequency response, or both, remain at a reduced level for the duration of a repetitive noise, rather than fluctuate between normal and reduced levels. Furthermore, during periods of mild repetitive noise, reducing separation is preferred as a first course of action. If the noise is severe, the frequency response should be reduced in addition to the reduction in stereo separation.

The output of the noise detector can be a digital (two state) or an analog signal representative of the level of noise. If the detector's output is analog, an A-to-D converter can easily generate a numeric output representative of noise level. When using a noise detector with a digital output format, a sampling technique calculates the duty cycle of the detector's output to generate a representative noise level indication such as a numeric type output. The numeric noise output is then delivered to the separation and frequency response control algorithm that performs as described below. As used in this disclosure, noise and multipath distortion may be interpreted interchangeably.

The noise detector is managed according to a detector managing algorithm. In the preferred embodiment, the algorithm provides two signal level thresholds: A stereo separation threshold A and a frequency response threshold F, F being greater than A, assuming that the detector's output increases as noise increases. If the detector output exceeds the stereo separation threshold A, the detector output is ignored for a predetermined time interval B, preferably the estimated time between nulls, and typically on the order of tens of milliseconds. Thus, the routine typically only receives one input per null.

A stereo separation manager 42 manages an output to be developed in the separation limiter 48 for the stereo separation control 26 of the stereo decoder 18. If noise threshold A is exceeded D times within a predetermined time interval C, stereo separation is reduced and a separation timer, metering a predetermined reduced separation time E, is started. Separation remains reduced until the time period E expires. If signal level A is exceeded while stereo separation is reduced, the reduced separation timer is restarted, during which separation remains reduced for an additional E time interval.

A frequency response manager 44 manages an output to be developed in the high frequency response limiter 50 for the frequency response control 30. If the noise threshold F is exceeded D times within a predetermined time interval C, and stereo separation has already been reduced, the frequency response manager 44 reduces the high frequency response and a high frequency reduction timer, metering a predetermined frequency response reduction time K is started, where K is less than the predetermined reduced separation time E. The response remains reduced until the time period K expires. If signal level F is exceeded while high frequency response is reduced, both the separation and the high frequency reduction timers are restarted, during which frequency response remains reduced for an additional time interval K and separation remains reduced for an additional time interval E. Preferably, K is less than E.

As a result, the invention provides an FM receiver circuit that provides stereo separation and frequency response control in a substantially less annoying manner to the listener. The invention utilizes an algorithm that reduces premature and numerous fluctuations of audio fidelity typical of most other systems. This invention provides a circuit that avoids the "busyness" that is often apparent to the listener with prior art systems which can at times be more objectionable than the noise and distortion it is trying to reduce; thereby this invention provides better apparent fidelity than previously known systems. The processing hysteresis is realized because the number of response occurrences to a threshold of the noise and distortion required to implement separation reduction, frequency response reduction, or a combination of separation reduction and frequency response reduction, are significantly greater than that required to maintain this reduction. Thus, this invention suppresses the noise and distortion created by multipath reception, with reduced compromise to audio fidelity as perceived by the listener.

DESCRIPTION OF THE PREFERRED EMBODIMENT

Figure 1:
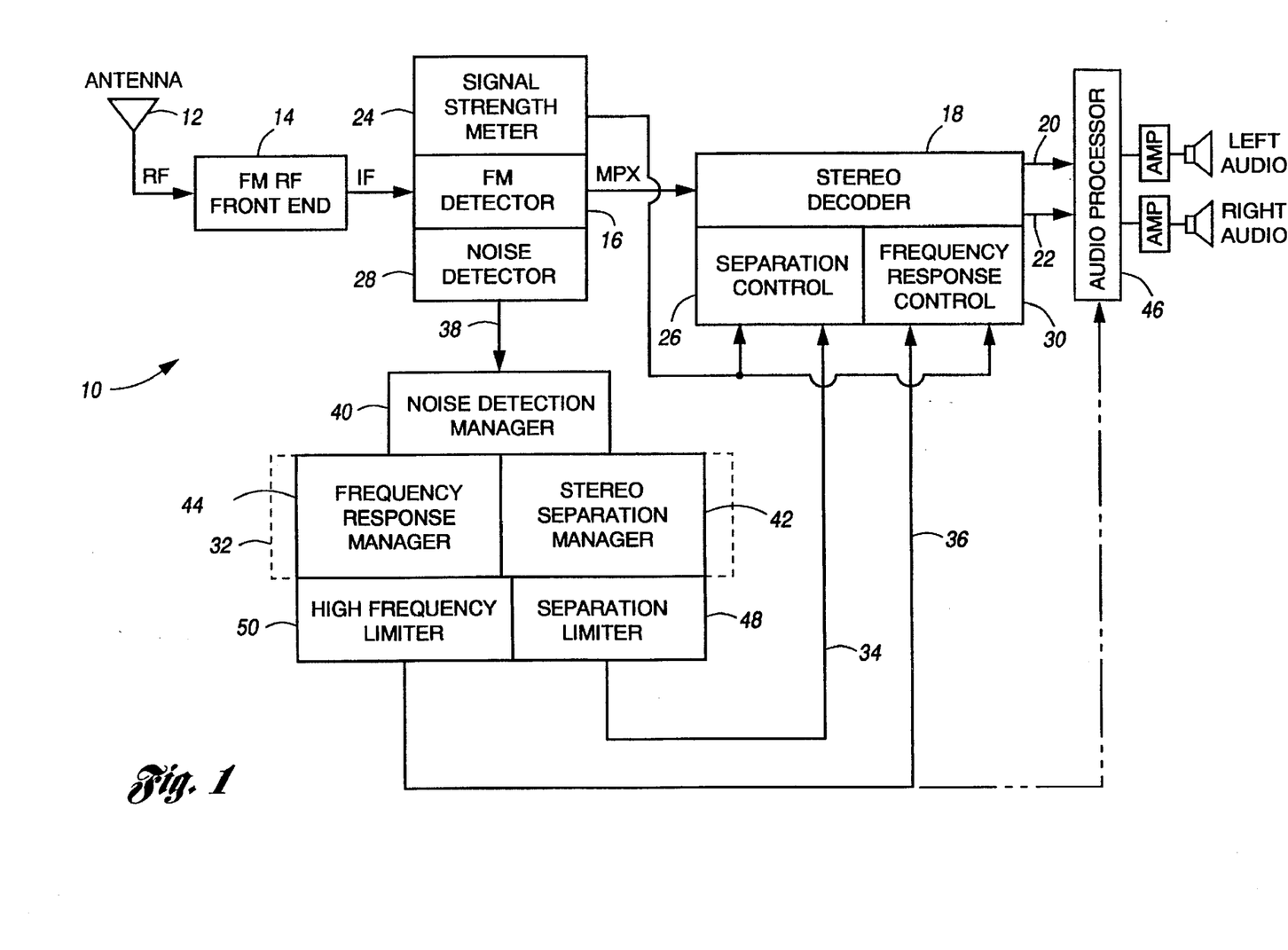
FIG. 1 is a schematic diagram of an FM receiver circuit incorporating multipath noise suppression control according to the present invention.

Referring first to FIG. 1, an FM receiver 10 for a motor vehicle includes an antenna 12 receiving a signal delivered to an FM radio frequency front end 14 encompassing RF tuning, amplification, and a mixer that delivers an intermediate frequency (IF) signal to an FM detector 16. The detector 16 provides a multiplex signal to the stereo decoder 18 that generates a left channel output 20 and a right channel output 22. Such a system may be of conventional construction such as those using commercially available FM receiver ICs.

As with some previously known systems, the FM detector 16 includes a signal strength meter delivering a DC signal to a separation control 26 and to a frequency response control 30, of the stereo decoder 18. In addition, the FM detector 16 includes a noise detector 28 that delivers a signal for further influence of the stereo separation and the frequency response controls 26 and 30, respectively. As used herein, reference to noise and the noise detector is a reference to detectors that generate an output responsive to either the distortion or the noise, or both, that accompany the received signal. In accordance with the present invention, radio system 10 includes a control circuit 32 that implements a hysteresis effect for providing controlled outputs 34 and 36 to the separation control 26 and the frequency response control 30, respectively.

The logic control noise detection manager 40 receives the signal output 38 representative of the noise content of the received signal. For example, the detector may output a DC signal proportional to high frequency content, such as over 75 KHz, in the multiplex signal delivered from the FM detector to an interface circuit 40. For example, when the output 38 is in digital format (two-state), the two-state output is sampled, within a acquisition time interval. A count is retained of the number of times the noise is high. The sample period being small compared to the time interval. For example, samples may be taken every 32 microseconds over a 4 millisecond time acquisition interval. The resultant count is an indication of the duty cycle of the noise. This is used to derive a numeric noise level output corresponding to the severity of the detected noise. To compensate for overlap of the noise occurrence beyond the acquisition time interval, the count of two or more consecutive intervals could be summed with previous interval(s) counts. Alternatively, where the output 38 is an analog signal, an analog to digital (A-D) conversion can be employed to obtain the numeric output.

The noise detection manager 40 uses the numeric output representing the output 38. The response control circuit 32 recognizes a first numerical response threshold, preferably a separation control threshold, and a second, preferably greater numerical response threshold, preferably a frequency response control threshold, as well as imposing a hysteresis for initiation and maintenance of stereo separation or frequency response reduction. The stereo separation manager 42 identifies the first threshold to manage a separation reduction output 34 from the separation limiter 48, input to the separation control 26, while the frequency response manager 44 identifies the second threshold to manage a frequency response reduction output 36 from the high frequency limiter 50, input to the frequency response control 30.

Figure 2:
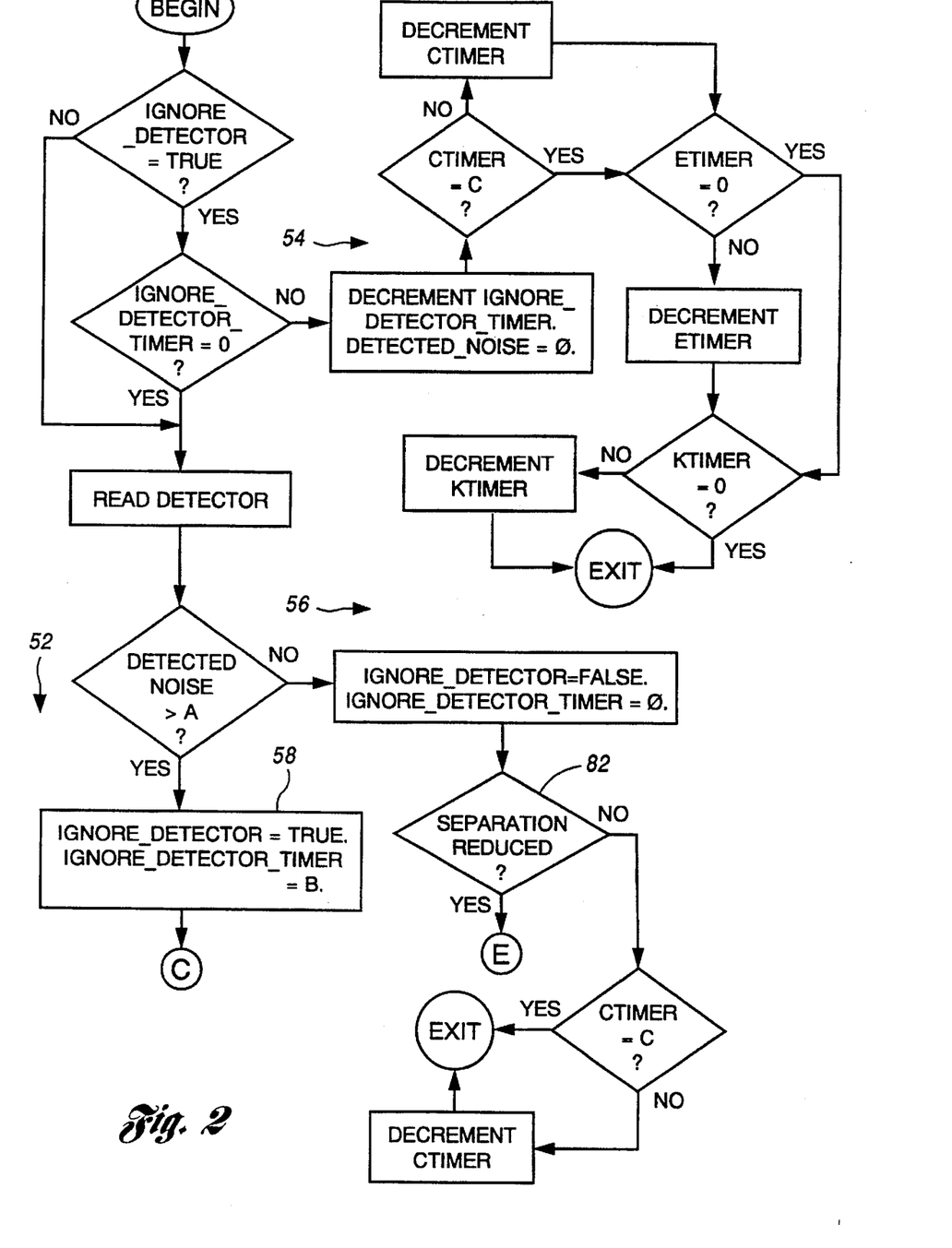
FIG. 2 is a flowchart of logic control for the management of a noise detector shown in FIG. 1.

Referring now to FIG. 2, the noise detection manager 40 (FIG. 1) buffers outputs to the stereo separation manager 42 and the frequency response manager 44. The circuit is designed with an ignore detector timer to ignore the detected noise once the noise level A has been exceeded and ignores it for a predetermined time period B. The time period B is preferably on the order of tens of milliseconds, the estimated time between nulls, which may be varied as a function of vehicle speed, environmental structures and other factors.

If the ignore detector timer is active (i.e., non-zero), the noise detection manager 40 decrements previously activated timers gauging the time period for which separation is to be reduced or the frequency response is to be limited as shown at branch 54 in FIG. 2. Moreover, at branch 56 in FIG. 2 where separation has not been reduced and the time period C has not been activated or been decremented, no further output to the separation manager 42 or frequency response manager 44 is made in response to the signals from the noise detector. Otherwise, the stereo separation manager and frequency response manger react to the detected noise level.

Figure 3A:
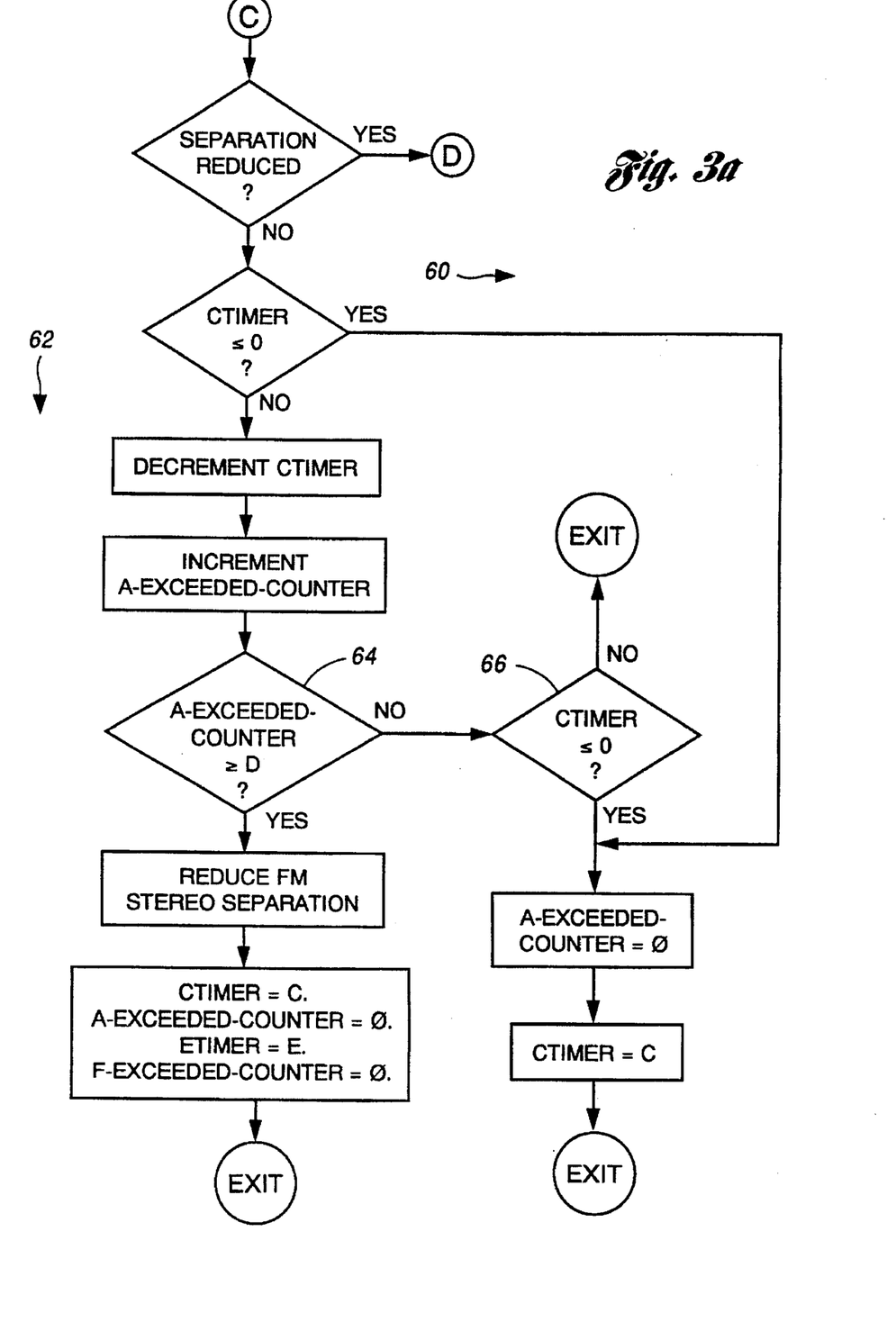
FIGS. 3a and 3b are flowcharts of logic control for the management of stereo separation in the circuit of FIG. 1.

Referring now to FIG. 3, when a detected noise from the interface 38 is greater than A, and the C timer is less than or equal to 0 when stereo separation has not previously been reduced, the timer for time period C in which the number D of indications of noise signal at a level greater than A is determined to have expired as shown at 60. If so, the A-exceeded counter is returned to zero and the C timer is again reset for time period C before exiting.

Alternatively, when the timer is determined to be operating within the time period C, the C timer is decremented and the counter for the number of signal outputs above the level A received within the period has incremented. Where the A-exceeded counter is greater than or equal to D, the reduced stereo separation output indication is provided to the separation limiter 48 which outputs signal 34 to the separation control. Accordingly, the C timer is then reset to C, the A-exceeded counter is reset to zero, a separation reduction timer is set for time period E and the F-exceeded counter is reset to zero before exiting.

Nevertheless, as shown at 64 and 66 if the number of A level signals received within the time period C is less than D, and the C timer is still running, the control exits, to await further input from the noise detection manager 40. When the C timer has expired, the A-exceeded counter is reset to zero and the C timer is reset to time period C before awaiting further input from the noise detection manager.

Figure 3B:
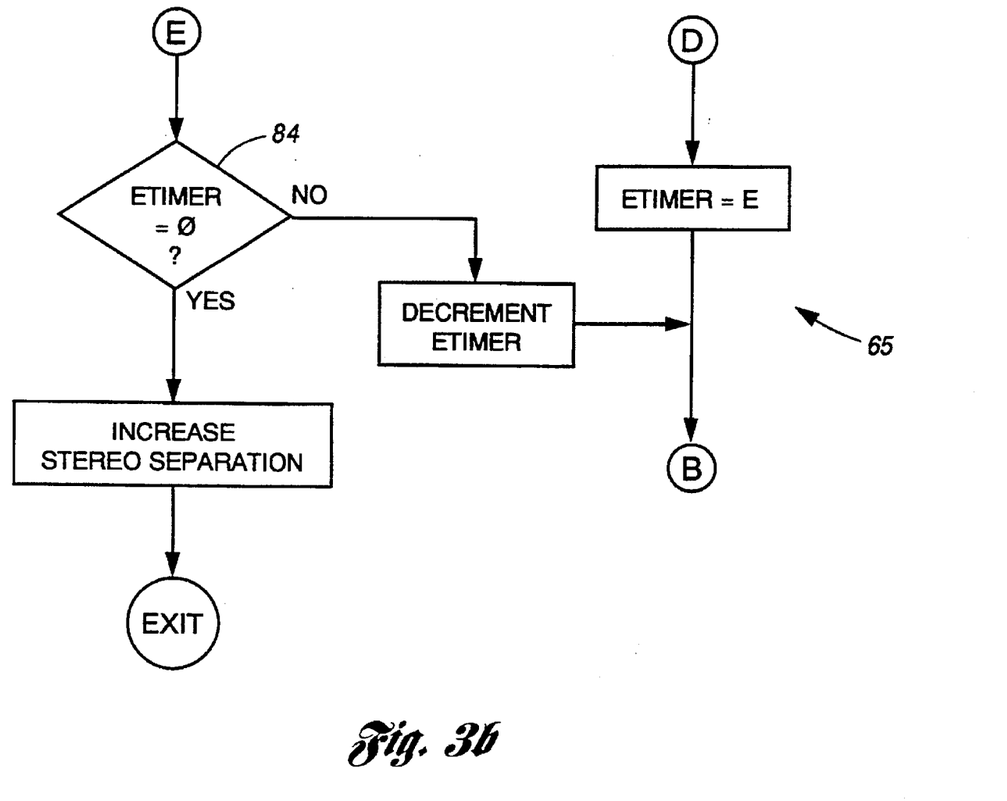

When the separation has already been reduced, the E timer is set to duration E before delivering a signal to the frequency response manager 44 as shown at 65 in FIG. 3b.

Figure 4A:
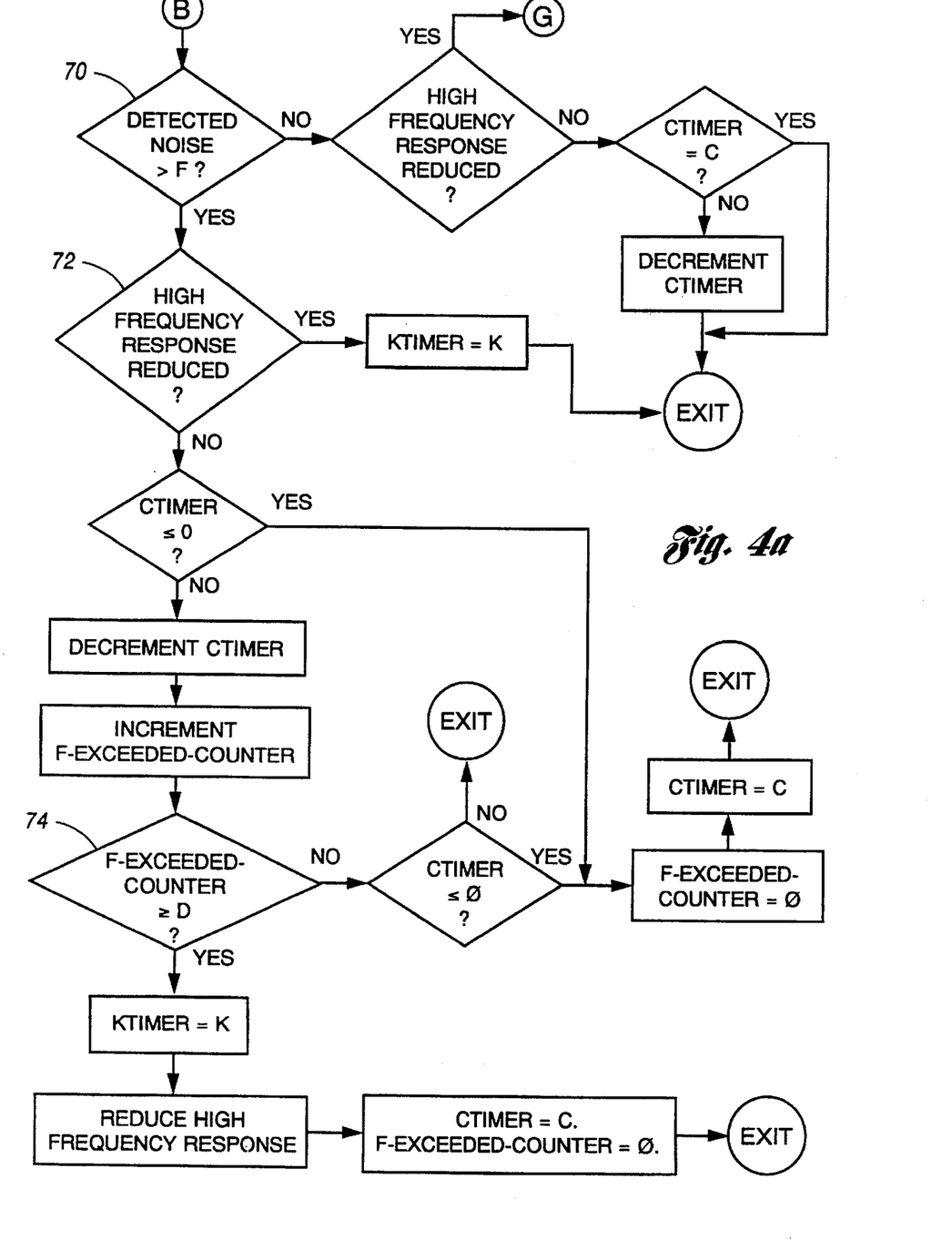
FIGS. 4a and 4b are flowcharts of logic control for the management of frequency response limitation.

As best shown in FIG. 4, when a detected noise level is above level F when the high frequency response is not previously reduced, the timer for interval C is monitored as shown at 72, and if time period C is expired, the F-exceeded counter is returned to zero, the C timer is reset to time period C and the monitor awaits further input from the noise detector. Alternatively, when the determination at 72 designates a period that is not less than or equal to zero, the C timer is decremented, the F-exceeded counter is incremented and a determination is made at 74 as to whether the F-exceeded counter has exceeded predetermined level D. If the number of indications at level F counter exceed D, the frequency response timer is set for duration K and a reduced high frequency response output is generated and delivered to the frequency response limiter 50 for generation of the signal driving the frequency response control 30. Accordingly, the interval timer is reset to time period C and the F-exceeded counter is returned to zero before awaiting further input from the noise detection manager.

When the F-exceeded counter 74 is at a number less than D, the C timer is monitored and if still counting within the time period C, causes the control to await further output from the noise detector. Alternatively, when the time duration C has expired, the F-exceeded counter is returned to zero, and the C timer is reset to time period C before awaiting further output from the noise detection manager 40.

As also shown in FIG. 4, when the high frequency response has previously been reduced and noise is detected beyond the level F, the K timer is reset before waiting further output from the noise detection manager 40.

Figure 4B:
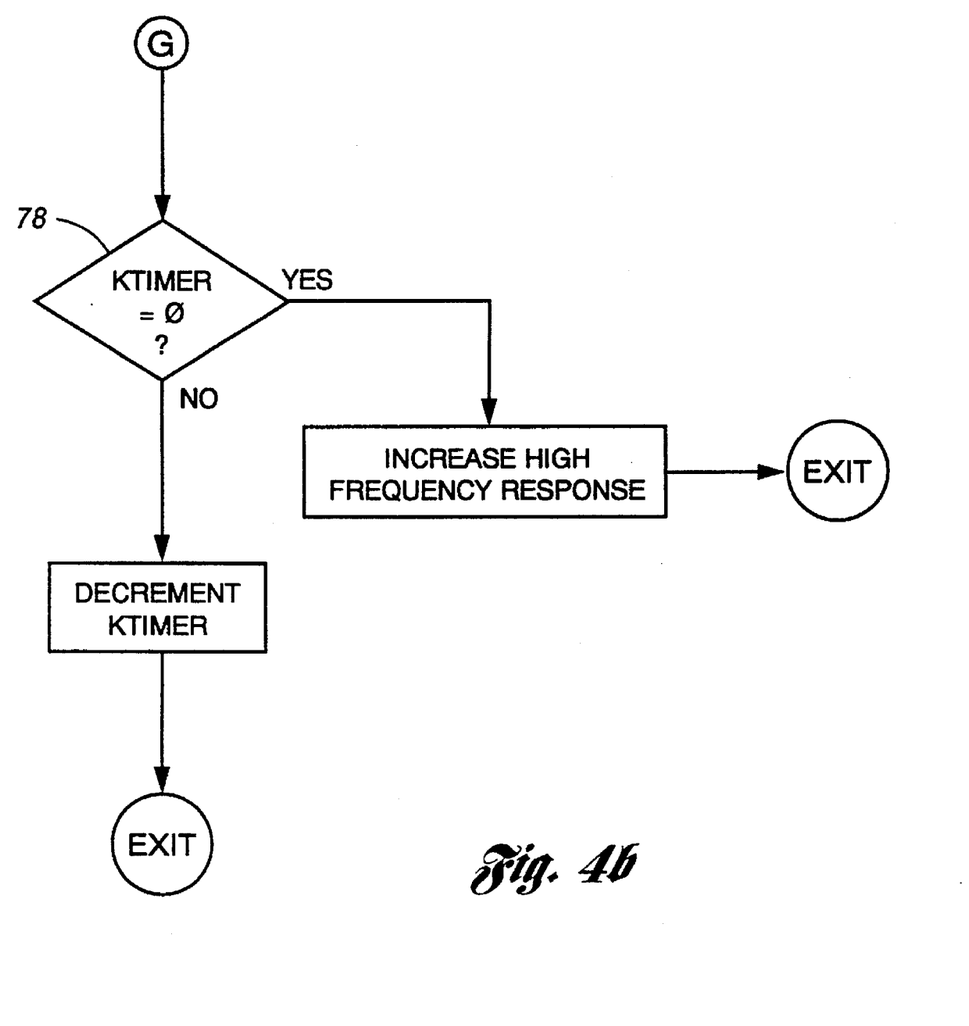

Moreover, when the high frequency response was reduced but the noise level detected is between levels A and F, the frequency response timer is monitored as shown at 78 in FIG. 4b. If this timer has expired, the frequency response may be increased by development of appropriate signal in the frequency response limiter 50 for driving a signal to control the frequency response control 30. As shown in phantom line in FIG. 1, the frequency response control drive signal may alternatively be delivered to the audio processor 46, for example, to the treble control of that processor. If the K timer is not yet expired, the frequency response timer is decremented before waiting further input from the noise detector.

Subsequently, when noise detection manager 40 no longer receives an indication of noise level exceeding threshold A, and separation was previously reduced as determined at 82 in FIG. 2, the stereo separation can be increased when the separation timer has expired as shown in FIG. 3b. If the timer has not expired, as determined at 84 in FIG. 3b, the timer is decremented before the frequency response manager 44 determines whether the signal is between A and F at 70 in FIG. 4a when frequency response is not reduced and then decrementing the C timer.

Having thus described the present invention, many modifications thereto will become apparent to those skilled in the art to which it pertains without departing from the scope and spirit of the present invention as defined in the appended claims.

What is claimed is:

1. A radiowave receiver having an antenna, a tuner, an amplifier and a control system including a noise detector, the receiver comprising:

a noise detector manager including, a noise detector monitor for determining whether the noise detector received a noise level that reaches at least one first threshold and a noise detector monitor for determining whether the noise detector received a noise level that reaches at least one second threshold;

a first manager for reducing one of stereo separation and frequency response in response to said determination of noise level at said first threshold; and a second manager for reducing the other of said stereo separation and said frequency response in response to said determination of noise level at said second threshold;

wherein at least one said manager includes a delayer for deferring the reducing of said one of stereo separation and frequency response until said first threshold in a first predetermined time period is exceeded a first plurality of times.

2. The invention as defined in claim 1 wherein said first manager reduces stereo separation after said first threshold is exceeded repeatedly for a predetermined period.

3. The invention as defined in claim 2 wherein said first manager maintains a reduced level of separation, and said second manager reduces level of frequency response when said second threshold is exceeded repeatedly within a second predetermined period of time.

4. The invention as defined in claim 1 wherein at least said first manager maintains said reduced level when at least one of said first and second threshold has been exceeded a second predetermined number of times within a second predetermined time period, said second predetermined number being less than said first plurality of times.

5. The invention as defined in claim 1 wherein at least said first manager maintains said reduced level when the appropriate threshold has been exceeded a second predetermined number of times within a second predetermined time period, said second predetermined time period being longer than said first predetermined time period.

6. The invention as defined in claim 1 wherein said noise detector manager includes:

an ignore detector timer and said noise detector manager sets said timer to ignore noise level signals exceeding said first threshold for a predetermined time after a first noise level signal exceeds said first threshold.

7. The invention as defined in claim 1 wherein the noise detector generates a two-state signal output, and said noise detector manager includes an interface for obtaining a numeric noise level output in response to said two-state signal output by calculating the duty cycle of said two-state signal output.

8. The invention as defined in claim 1 wherein said noise detector generates an analog signal and said noise detector manager includes an interface for obtaining a numeric noise level output by an analog to digital conversion.

9. An FM radiowave receiver with separated stereo channel de-multiplexing, comprising:

an FM detector block providing a noise detector that generates a noise output signal;

a noise detector manager for determining when said noise output signal exceeds a first threshold level of representative output from a noise detector;

a stereo separation manager for reducing separation of stereo when said first threshold level of noise is exceeded for a first predetermined period or repeatedly for a second predetermined period;

wherein said detector manager includes means for determining when said output signal exceeds a second threshold signal greater than said first threshold; and a frequency response manager for reducing frequency range of an audio signal output from said receiver when said second threshold is exceeded for a predetermined period or repeatedly within a second predetermined period and said stereo separation manager has reduced separation to a first reduction level.

* * * * *